3,534,271
CIRCUIT FOR MEASURING THE TIME DIFFERENTIAL BETWEEN TWO PULSES
Herbert C. Loewer, San Diego, Calif., assignor to Ryan Aeronautical Co., San Diego, Calif., a corporation of California
Filed July 25, 1967, Ser. No. 655,841
Int. Cl. H53k 5/20
U.S. Cl. 328—109      5 Claims

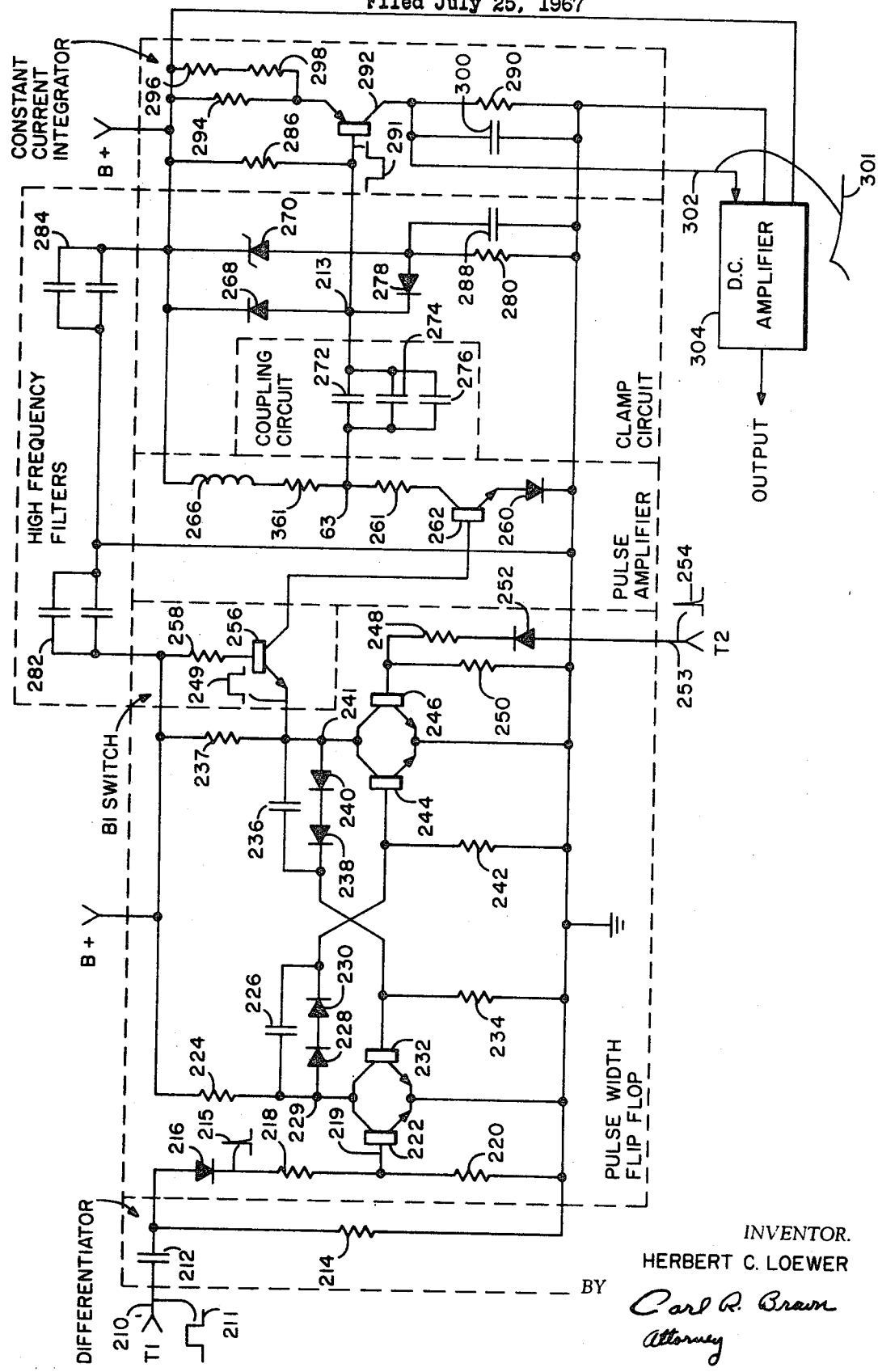

ABSTRACT OF THE DISCLOSURE

This circuit provides a direct-current voltage output having a magnitude level proportional to the time differential between two pulses and employs a very high speed flip flop circuit in conjunction with a transistor bi-switch that with a high frequency pulse amplifier minimizes delay and storage times and maintains constant pulse width and rise and fall times over a wide temperature range.

BACKGROUND OF THE INVENTION

It has been found advantageous, as for example in radar altimeters, to have a circuit capable of providing a very accurate direct current analog output having a magnitude level proportional to the time space between pulses. Radar altimeters usually employ a short-pulse radar signal and measures the time difference between the transmitted pulse and the returned or echo video pulse. Thus a pulse train, varying in width only, is generated from the time difference of the transmitted pulse and the ground returned video. The radar altimeter circuitry then processes the pulse train into direct current analog voltages proportional to altitude.

In general the radar altimeter operates most effectively, compared to other altimeters, at low altitudes down to ground level. However some radar altimeter circuits have inherent circuit induced time delays that, because of the very short time intervals involved, for example in the order of a few nanoseconds, make it difficult for such radar altimeters to accurately measure the altitude at low altitudes. Further such radar altimeter circuits often have large power requirements and their output are subject to error in varying temperature environments, and because of noise and interference signals. Thus it has been found advantageous to have a circuit capable of accurately measuring the time differential between two pulses with a minimum time delay, that is not affected by changes in temperature and that has low power requirements.

SUMMARY OF THE INVENTION

The circuit of this invention provides a direct-current analog voltage having a magnitude representing the time differential between a first pulse, such as a pick-off pulse from the transmitted signal of a radar transmitter in a radar altimeter, and a spike pulse, such as a video echo pulse from a radar return. The circuit has a high speed flip flop that is set to an initial condition by the leading edge of the first pulse. The output of the flip flop circuit causes a transistor bi-switch to feed a pulse through a pulse amplifier and a coupling circuit to a clamp circuit, providing a square wave output having extremely short rise and fall times.

The square wave output of the clamp circuit is integrated by a constant current integrator providing an output pulse that has a short rise time and a relatively long fall time. This output pulse is amplified by a DC amplifier.

Thus the circuit insures that the output to the DC amplifier is an analog voltage that is accurately and reliably proportional to the time difference between the pulses and accomplishes its operation with a minimum time delay and with a minimum of storage time.

It is therefore an object of this invention to provide a new and improved circuit for measuring the time differential between two pulses.

It is another object of this invention to provide a new and improved circuit for measuring the time differential between a transmitted radar pulse and a video echo pulse in a radar altimeter.

It is another object of this invention to provide a new and improved circuit for measuring the time differential between a radar transmitted and received pulse, which circuit has very high speed operation, low power requirements and accurate voltage outputs.

It is another object of this invention to provide a new and improved circuit for measuring the time differential between two pulses that has minimum and constant time delays and minimum storage times.

Other objects and many advantages of my invention will become more apparent upon a reading of the following detailed specification and in viewing the drawing.

The figure shows in schematic form the preferred embodiment of the invention.

The circuit comprises a RC differentiator circuit, a pulse width flip flop, a bi-switch, a pulse amplifier with a high frequency filter 282 and 284, a coupling circuit, a clamp circuit, and a constant current integrator, that provide an output signal to the DC amplifier 304. The embodiment of the circuit operates as follows:

A first pulse T1 is applied to input line 210. This pulse T1 has a square waveform 211 and may be a pulse picked off from the radar transmitted pulse in a radar altimeter. The pulse T1 is fed to a RC differentiator circuit comprising capacitor 212 and resistor 214 that gives pulse T1 the spike waveform 215. A unidirectional device 216 functions as a positive gate and resistor 18 is a current limiting resistor. Resistor 220 is a DC pass to ground. The spike pulse 215 is applied through line 219 to the base of transistor 222 and turns on transistor 222. Transistors 222 and 232 are connected common emitter and common collector with isolated bases. The operating transistor 222 shorts to ground the drive current at point 229 for turning transistor 244 off. This allows the voltage at junction 241 to rise to, for example two (2) volts and create a drive voltage through unidirectional devices 238 and 240 to the base of transistor 232 turning on transistor 232. The voltage at 241 is limited by unidirectional devices 238 and 240 to the two (2) volt level. Thus in this condition, the flip flop is in a stable condition with transistors 222, 244, and 246 in the off condition and transistor 232 in the on condition.

In the operation of the pulse width flip flop, the resistors 220, 234, 242, and 250 rapidly remove the stored base charge to ground of the respective shut off transistors, thus allowing the transistors to turn off as rapidly as possible. The diodes 228, 230, 238 and 240 function to limit the voltage at points 229 and 241 to, for example the two (2) volt signal. This limits the drive current applied to the base of the transistors 232 and 244 and thus reduces the overall storage charge that buids up on the bases of these transistors. The capacitors 226 and 236 function as speed up capacitors that transfer their charge immediately to the base of the turned off transistor, causing the transistor to turn off more rapidly.

The flip flop is now in a stable condition having rapidly turned transistor 232 on providing a square wave voltage pulse 249 to the bi-switch transistor 256. Bi-switch transistor 256 normally passes current from the B+ supply to ground through resistor 258, through transistor 256 and through transistor 244 to ground. However when the potential increases at point 241, then the bi-switch transfers current from the B+ supply through resistor 258, transistor 256, transistor 262 and unidirectional device 260 to ground. This saturates and turns on transistor 262 and pulls the voltage at point 63 toward ground potential generating the start of a square wave pulse having very rapid rise time. In response to the second pulse T2, the trailing edge of the square wave pulse has a very rapid fall time. For example, this square wave pulse 291 has substantially vertical sides with a minimum time width in the order of 10 nanoseconds. Diode 260 functions to reduce the storage time of the transistor 262 and increases the speed of its operation. Inductor device 266 helps maintain the constant rise time and sharpens the rise and fall time of the square wave. Resistor 361 functions as a load and resistor 261 functions as a current limiter resistor. Capacitors 272, +274, and 276 function as coupling and DC blocking capacitors.

Accordingly a square wave 291 of short time duration and a substantially vertical side is generated in line 213 as a result of pulse T1. The unidirectional device 278, resistor 280, unidirectional device 270 and capacitor 288 function to limit or clamp the voltage amplitude of the square wave to a given magnitude. Unidirectional device 270 is a temperature compensted Zener diode and diode 278 temperature compensates and clamps the square wave pulse to a precise amplitude level.

The signal is fed by line 213 to the base of transistor 292, turning the transistor on and providing a constant current source to the integrating circuit formed by resistor 290 and a condenser 300. Resistor 286 functions as the load. The resistor network 294, 296 and 298 combine to set the current drive to the integrating circuit through the energized transistor 292. This resistor network thus sets the integrating current at a given constant rate. The discharge time of the constant current integrator is set by the time constants of the combination resistor 290 and capacitor 300 circuit. The wave shape at point 302 thus has a shape substantially shown as wave shape 301, that has a short time constant rise and a long time constant fall.

The second pulse T2 that may be a video echo pulse from the radar return that has been shaped to a spike waveform 254 is fed through line 253, through unidirectional device 252, through current limiter resistor 248 to the base of transistor 246. This pulse T2 is spaced a short time interval, a few nanoseconds, after the leading edge of pulse 211 and this time interval is the time to be measured by the circuit. The video echo pulse T2 turns transistor 246 on and this immediately pulls point 241 to substantially ground potential and thus through unidirectional devices 238, 240, drops the driving voltage on the base of transistor 232 causing transistor 232 to be rapidly turned off. When transistor 232 is turned off, the voltage at point 229 increases and applies driving voltage through voltage limiting unidirectional devices 228 and 230 to transistor 244, turning on transistor 244. Capacitor 236 functions to release its charge causing transistor 232 to turn off more rapidly and resistor 234 drains the storage charge in transistor 232 rapidly to ground. In this stable condition, transistor 244 is on and transistors 232, 222, 246 are turned off. The de-energizing of transistor 232 thus substantially shorts to ground the voltage at point 241 giving the square wave 249 and removes the limited potential applied to the bi-switch 256. Upon removal of the voltage at junction 241 from transistor 256, the bi-switch transistor 256 switches the curent flow from the B+ supply through resistor 258 and through transistor 256 from transistor 262 to a path through energized transistor 244 to ground. This turns off transistor 262 in an extremely rapid manner because there is substantially a short circuit through transistors 256 and 244 to ground. This rapid turnoff of transistor 262 causes the voltage at point 63 to rise rapidly with the help of inductor 266 and de-energizes transistor 292 immediately ending the integration operation. The output wave 301 from the integrator circuit thus has a rapid rise time and a relatively long fall time.

OPERATION

In operation, the first pulse T1 is applied to line 210 and is differentiated through the differentiating circuit comprising capacitor 212 and resistor 214. The spike shaped output 215 is then applied to the base of transistor 222 causing this transistor to be turned on. The low impedance to ground through transistor 222 rapidly drops the potential at point 229, that through unidirectional devices 228 and 230 drops the potential level on the base of energized transistor 244 causing transistor 244 to be turned off. The storage current is drained through resistor 242 to aid in speeding up the turning off of transistor 244. When normally energized transistor 244 is de-energized, then the voltage through the B+ power supply through resistor 258 and bi-switch transistor 256 causes the voltage to rise at point 241. This rise in voltage is limited to a given value of, for example, two volts by unidirectional devices 238 and 240. This application of a voltage pulse on the bi-switch transistor 258 causes the current to be switched to the base of transistor 262 and to ground through unidirectional device 260. The increase of voltage at point 241 causes an increased driving current to be applied to the base of transistor 232 that in turn energizes transistor 232 and de-energizes transistor 244. The de-energizing of transistor 244 holds the potential signal at point 241 that causes transistor 262 to provide a sharp wave pulse 291 to be applied to the base of transistor 292. Transistor 292 provides an output voltage that is integrated to provide a given level pulse depending upon the width of the square wave applied at the base of transistor 292 that is determined by the point in time that the return video echo pulse T2 is applied to the flip flop circuit causing the flip flop circuit to shut off the voltage wave at 292. Since the first pulses T1 and the second pulses T2 are continuously received by the circuit, the output voltage level to the DC amplifier represented by DC voltage 301 has a continuing nature that assumes a level, which DC potential level is proportional to the time differential between the pulses. Thus the circuit provides a serial plurality of given DC voltages for a given time interval to the integrator that are identical in width for identical time differentials. The DC output level from the integrator is amplified by a known DC amplifier providing a voltage level of higher magnitude suitable for various uses.

Having described my invention, I now claim:

1. A circuit for measuring time differential between the leading edges of two pulse signals comprising, flip flop means responsive to said two pulse signals for being placed in a first condition by said first pulse signal providing an output and in a second non-output condition upon receiving said second pulse signal, bi-switch means having two separate conditions for switching an output current in response to the condition of said flip flop means, pulse amplifier means responsive to the switching of said bi-switch means for providing a square wave signal having a rapid rise and fall time and having a time length proportional to the time interval between said two pulses, said bi-switch means having two current channels for being connected to a power supply and being responsive to said output of said flip flop means for passing current to the first of said channels in a first of said two separate conditions when said flip flop means is in said first condition and passing current to said second channel in the second of said two separate conditions when said flip-flop means is in said second condition, said pulse amplifier means is responsive to the initiation and termination of current in said second channel in providing said square wave signal, and integrator means for integrating the output of said pulse amplifier means.

2. A circuit according to claim 1 in which, said pulse amplifier means being electrically connected to said first channel of said bi-switch means and providing said signal output only in response to receiving a current in said first channel.

3. A circuit for measuring the time differential beween the leading edges of two pulse signals comprising, flip flop means responsive to said two pulse signals for being placed in a first condition by said first pulse signal providing an output and in a second non-output condition upon receiving said second pulse signal, bi-switch means having two separate conditions for switching an output current in response to the condition of said flip flop means, pulse amplifier means responsive to the switching of said bi-switch means for providing a square wave signal having a rapid rise and fall time and having a time length proportional to the time interval between said two pulses, said bi-switch means comprises a transistor with its base connected to a power supply and its emitter and collector respectively connected between said flip flop means and said pulse amplifier means, and said integrator means for integrating the output of said pulse amplifier means.

4. A circuit according to claim 3 in which, said integrator means including a voltage divider means for causing said integrator means to provide a constant current output proportional in time to the time length of said square wave signal.

5. A circuit for measuring the time differential between the leading edges of two pulse signals comprising, flip flop means responsive to said two pulse signals for being placed in a first condition by said first pulse signal providing an output and in a second non-output condition upon receiving said second pulse signal, said flip flop means comprising two pairs of transistors connected common emitters and common collectors with the bases isolated, the driving voltage to each of said pairs of transistors being connected to the joined collectors of one pair of transistors and through a capacitor and diode means in parallel to the base of an opposite one of said transistors in said other pair, said two pulse signals being applied to the bases of the other of said transistors in each of said pairs, bi-switch means having two separate conditions for switching an output current in response to the condition of said flip flop means, pulse amplifier means responsive to the switching of said bi-switch means for providing a square wave signal having a rapid rise and fall time and having a time length proportional to the time interval between said two pulses, and integrator means for integrating the output of said pulse amplifier means.

References Cited

UNITED STATES PATENTS

| | | | |
|---|---|---|---|
| 2,421,018 | 5/1947 | De Rosa | 343—13 |
| 2,740,112 | 3/1956 | Goldberg | 343—13 |
| 3,211,993 | 10/1965 | Golden | 324—83 |
| 3,255,625 | 6/1966 | Ellison | 324—68 |

JOHN S. HEYMAN, Primary Examiner

D. M. CARTER, Assistant Examiner

U.S. Cl. X.R.

307—232; 328—130; 343—13